T. S. AYERS.
STEAM CONDENSATION METER.
APPLICATION FILED FEB. 20, 1919.
1,314,039.
Patented Aug. 26, 1919.
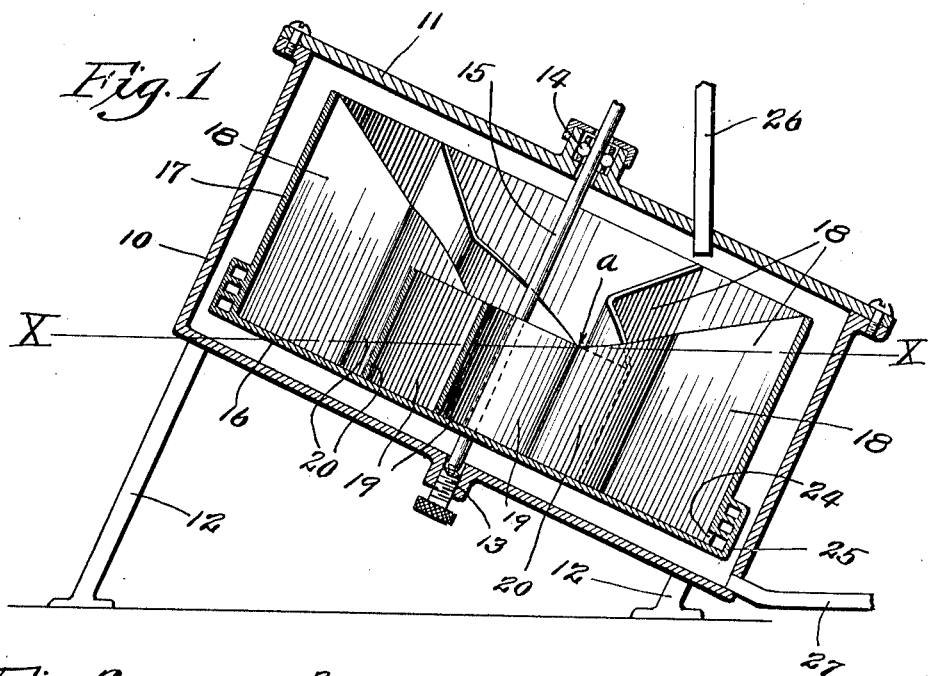
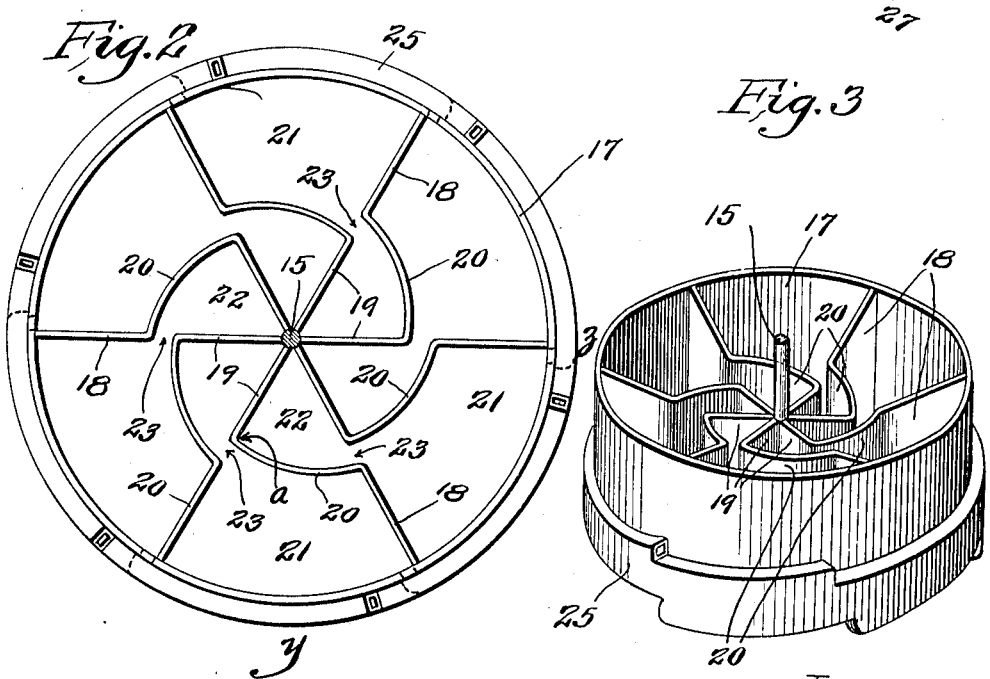
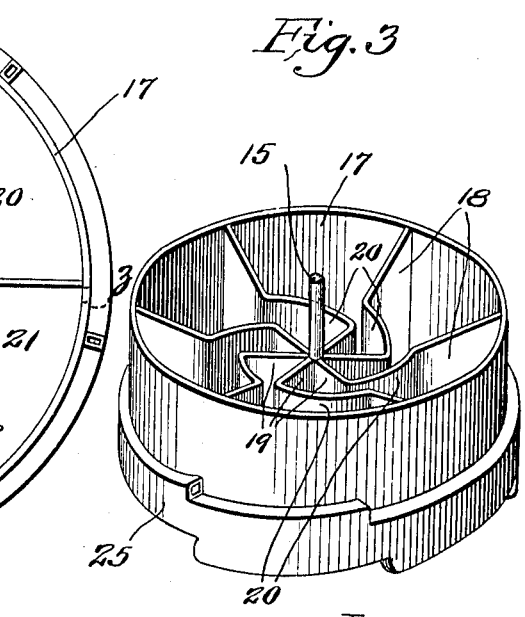
Inventor
Theodore S. Ayers

UNITED STATES PATENT OFFICE.

THEODORE S. AYERS, OF ST. LOUIS, MISSOURI.

STEAM-CONDENSATION METER.

1,314,039.　　　　Specification of Letters Patent.　　Patented Aug. 26, 1919.

Application filed February 20, 1919. Serial No. 278,116.

*To all whom it may concern:*

Be it known that I, THEODORE S. AYERS, a citizen of the United States, residing at St. Louis, Missouri, have invented a certain new and useful Improvement in Steam-Condensation Meters, of which the following is a full, clear, and exact description, such as will enable others skilled in the art to which it appertains to make and use the same, reference being had to the accompanying drawings, forming part of this specification.

My invention relates generally to a meter or measuring apparatus for fluids and more particularly to a meter for measuring the water resulting from the condensation of steam, and my invention is particularly designed for use in plants where steam is generated for power and heating purposes.

It will be understood that in practically all steam producing plants, and particularly the larger ones, it is desirable, and very often essential, to obtain an accurate record of the amount of steam power produced and the fuel required for producing the steam, and to do this, meters are employed for measuring the water of condensation resulting from the exhaust steam.

It is the principal object of my invention to provide a relatively simple meter or measuring device which will very accurately measure the water or other fluid passing through it and further, to provide a meter which is entirely automatic in action, noiseless in operation, and very effective in performing its intended functions.

Further objects of my invention are, to provide a fluid meter wherein the friction between the operating parts is reduced to a minimum; and further, to provide a fluid meter which is actuated solely by the weight of the fluid delivered to it.

With the foregoing and other objects in view, my invention consists in certain novel features of construction and arrangement of parts, hereinafter more fully described and claimed, and illustrated in the accompanying drawings, in which—

Figure 1 is a vertical section taken through the center of a steam condensation meter of my improved construction.

Fig. 2 is a plan view of the rotating measuring member of my improved device.

Fig. 3 is a perspective view of the rotating measuring member.

Referring by numerals to the accompanying drawings which illustrate a practical embodiment of my invention, 10 designates a suitable housing or container of any desired construction, and removably positioned on the top thereof is a cover plate 11. This housing is mounted on a suitable base or supports 12 and it occupies an inclined position so that its bottom and cover plate occupy parallel planes which are at angles of approximately twenty-five or thirty degrees with respect to a horizontal plane.

Arranged in the central portion of the bottom of the housing or container 10 is a bearing 13, preferably adjustable, and arranged in the central portion of the cover plate is an anti-friction bearing 14 of any desired type. Mounted for rotation in the bearing 14 with its lower end carried by bearing 13 is a shaft 15 on which the measuring receptacle of the device is positioned. This measuring member comprises a bottom plate 16, an annular wall 17 rising from the marginal edge of said bottom plate, and a series of substantially radially arranged partitions disposed between the shaft 15 and wall 17. Each of these partitions includes an outer portion 18, an inner portion 19, and an intermediate portion 20.

The portion 18 is in the form of a plate or wall which extends radially inward from the wall 17 and the upper edge of this outer wall portion declines gradually away from the wall 17 so that said upper edge occupies a plane at an angle of approximately twenty-five or thirty degrees with respect to the plane occupied by the upper edge of wall 17.

The inner portion 19 of each partition extends radially outward from shaft 15 and said inner portion occupies a vertical or upright plane at an angle of approximately sixty degrees with respect to the corresponding plane occupied by the outer portion 18 of the partition.

The inner wall portion 19 is approximately half the height of the wall 17 and the upper edge of said inner wall portion 19 occupies a plane substantially parallel with the planes occupied by the bottom 16 and the upper edge of wall 17.

Intermediate wall portion 20 unites the outer edge or end of inner wall portion with the inner edge or end of outer wall portion 18 and by reason of the angular arrangement of the wall portions 18 and 19 with respect to each other, said intermediate wall portion 20 is curved throughout its length so that it occupies a position slightly eccentric to the shaft 15 and annular wall 17. The upper edge of intermediate wall portion 20 declines gradually from the point where said wall unites with outer wall member 18 to the point where the inner portion of said intermediate member unites with the inner wall member 19.

The angle of inclination of the upper edge of the intermediate wall portion is approximately the same as that of the upper edge of outer wall member 18. By virtue of this arrangement and formation of the members forming each partition, the lowest point on the upper edge of each partition is at the point where the upper edge of intermediate member 20 joins the upper edge of the inner member 19. Consequently, the upper edge of each partition inclines gradually upward in both directions from this point.

By virtue of the construction and arrangement of the partitions just described, the rotating measuring member of the device is formed with a series of open-topped compartments or chambers, each of which comprises a relatively large outer chamber 21 and a smaller inner chamber 22, said chambers being united by a relatively narrow space 23, the latter being disposed between the inner end or edge of the outer member 18 of one partition and the outer end or edge of the inner member 19 of the next adjacent partition.

Formed through the lower portion of the wall 17 and immediately adjacent to the side of each partition is an outlet aperture 24 and leading from each one of these apertures around the lower portion of wall 17 for a distance slightly less than half its circumference, is a discharge pipe 25. In view of the fact that there are a number of these discharge pipes or one for each compartment or chamber within the rotating measuring member, portions of said pipes will overlap each other, and I prefer to arrange the overlapping portions one above the other, as illustrated in Figs. 1 and 3.

Leading into the housing or container 10 and preferably through the cover plate thereof is a pipe or conduit 26 which delivers the water of condensation or fluid to be measured to the chambers or compartments within the rotating measuring member, said pipe being located so that the discharge therefrom will gravitate or pass downward into the lowermost portion of the lower one of the chambers or compartments.

Leading from the lowermost portion of the housing or container 10 is a pipe or conduit 27 which carries off the water of condensation or fluid after the same has passed through the apparatus and been measured therein.

It will be understood that rotating measuring members constructed in accordance with my invention can be made in various sizes to suit different conditions and requirements and that the exact capacity of each chamber or compartment in the rotating member is known. Further, it will be understood that when the apparatus is set up for use, the parts occupy substantially the positions indicated in Fig. 1 so that the lowermost or overflow point on the upper edge of the lowermost one of the partitions is the point $a$ on said figure and likewise the point $a$ on Fig. 2.

Water of condensation or fluid to be measured is delivered to the apparatus through pipe 26 and discharges into the lowermost one of the compartments and the water will rise in this compartment until it reaches the overflow level, and which latter is indicated by the horizontally disposed dotted line $x$—$x$ in Fig. 1. When this level has been reached, the water will begin to overflow at point $a$ into the next adjacent righthand compartment or inner portion 22 of said compartment, and this overflow of water will pass through space 23 into the larger portion 21 of said next adjacent compartment. The water cannot overflow into the next adjacent lefthand one of the compartments for the reason that all portions of the partition wall between the lowermost compartment and the next adjacent lefthand compartment are higher than the overflow point $a$.

As the overflow gradually increases to the next adjacent righthand compartment, the weight of the gradually increasing volume of water in said next adjacent righthand compartment will tend to rotate the measuring member, in which the compartments are formed, clockwise until finally the next adjacent righthand compartment into which the water has been overflowing, will be brought into position so that it receives water or fluid directly from pipe 26 and as the flow of water or fluid continues through the supply pipe, said water will continue to rise in this compartment until said water overflows at the low point on the upper edge of the next adjacent righthand partition.

As long as the flow of water or fluid through pipe 26 remains constant or uniform, this successive filling of the compartments and overflow from one compartment to another will continue, and as a result the rotary motion of the measuring member will be uniform, noiseless and without vibration.

As soon as each outlet opening 24 passes the lowermost point in its travel or the point y, Fig. 2, water from the compartment from which said lowermost outlet leads, will pass into the discharge pipe leading from said outlet and this pipe will slowly fill as the measuring member continues to rotate and as soon as the discharge end of this pipe passes the point z, Fig. 2, water will commence to discharge from said pipe and continue to discharge therefrom until the compartment with which said pipe is associated, is empty. This water passes downward to the lowermost portion of the chamber within the container 10 and discharges therefrom through pipe or conduit 27.

It will be understood that as the measuring member slowly rotates, the water in the compartments, after passing the point y, will commence to discharge, thereby gradually decreasing the weight on the lefthand side of said member and simultaneously the water passing into the compartment of the measuring member is constantly overflowing from the chamber immediately below the inlet pipe 26 to the next adjacent righthand chamber with the result that the weight is always gradually increasing on the righthand side of the member. Consequently, the latter will be slowly and continuously rotated.

Suitable counting and indicating mechanism (not shown) is arranged to be actuated by the shaft 15 so as to indicate each complete revolution thereof, and as the capacity of each measuring member and its compartments is known, a reading of the indicating mechanism will at all times give the actual amount of water of condensation or other fluid that has passed through the meter.

My improved means of mounting the shaft which carries the measuring member is effective in reducing to a minimum the friction developed while said shaft is in operation, and consequently the device is very sensitive in operation. While the meter is in operation, the weight of the water on the lefthand side of the container or in the lefthand compartments, which latter are gradually moving upward, partially and to a considerable extent counterbalances the weight of the water in the righthand compartments, but as the water is continually overflowing or passing into the compartments which are approaching the lowermost level, the preponderance of weight is continuously transferring to the righthand side of the apparatus with the result that the container and shaft will rotate evenly and without vibration.

The rotating measuring member can be formed with any desired number of compartments and the partitions between the compartments can vary in shape from that herein shown and described, although it is essential that the upper edge of each partition be substantially of the contour herein disclosed.

A meter of my improved construction is comparatively simple, can be easily and cheaply manufactured, inasmuch as it comprises but few parts, operates noiselessly and without vibration, and is very accurate and effective in performing its intended functions.

It will be readily understood that minor changes in the size, form and construction of the various parts of my improved meter can be made and substituted for those herein shown and described, without departing from the spirit of my invention, the scope of which is set forth in the appended claims.

I claim:

1. In a meter of the class described, a receptacle mounted to rotate in an inclined plane, partitions arranged within said receptacle for dividing the space therein into a plurality of compartments, each of which comprises an inner chamber and an outer chamber, and which chambers are offset with respect to each other.

2. In a meter of the class described, a receptacle mounted for rotation in an inclined plane, partitions within said receptacle for dividing the space therein into a series of compartments, each of which partitions comprises an inner wall portion and an outer wall portion, the same occupying different radial planes, and an intermediate portion connecting said inner and outer wall portions.

3. In a meter of the class described, a receptacle mounted for rotation in an inclined plane, partitions within said receptacle for dividing the space therein into a series of compartments, each of which partitions comprises an inner wall portion and an outer wall portion, the same occupying different radial planes, the outer wall portion being substantially higher than the inner wall portion, and an intermediate portion connecting said inner and outer wall portions.

4. In a meter of the class described, a receptacle mounted for rotation in an inclined plane, partitions within said receptacle for dividing the space therein into a series of compartments, each of which partitions comprises an inner wall portion and an outer wall portion, the same occupying different radial planes, the outer wall portion being substantially higher than the inner wall portion, and an intermediate portion connecting said inner and outer wall portions, the upper edge of which intermediate portion declines gradually from the upper edge of the outer wall portion to the upper edge of the inner wall portion.

5. In a meter of the class described, a receptacle mounted for rotation in an inclined plane, said receptacle being divided into a series of separate compartments, each of which comprises an outer chamber and an inner chamber, and the two chambers of each compartment being offset with respect to each other.

6. In a meter of the class described, a receptacle mounted for rotation in an inclined plane, partitions dividing said receptacle into a series of compartments, the upper edge of each partition being provided with portions which are inclined with respect to each other.

7. In a meter of the class described, a receptacle mounted for rotation in an inclined plane, partitions dividing said receptacle into a series of compartments, the upper edge of each partition being provided with portions which are inclined with respect to each other and with respect to a horizontal plane.

8. In a meter of the class described, a receptacle mounted for rotation in an inclined plane, partitions dividing the space within said receptacle into a series of compartments, each comprising an inner chamber and an outer chamber, said chambers being offset with respect to each other, and the upper edge of each partition being provided with portions which are inclined with respect to each other.

9. In a meter of the class described, a receptacle mounted for rotation in an inclined plane, partitions arranged within said receptacle to form a plurality of compartments, and said partitions being disposed and formed so that fluid delivered into the lowermost one of the compartments and rising therein will overflow into one of the next adjacent compartments.

10. In a meter of the class described, a receptacle mounted for rotation in an inclined plane, partitions arranged in said receptacle and dividing the same into a series of compartments, which partitions are disposed and formed so that the fluid delivered to said receptacle will pass successively from one compartment to another and thereby act through gravity to effect rotation of the receptacle.

11. In a meter of the class described, a receptacle mounted for rotation in a plane which is slightly inclined with respect to a horizontal plane, partitions arranged therein and dividing the space within said receptacle into a plurality of compartments, which partitions are disposed and formed so as to confine and direct the flow of fluid from one compartment to another, thereby effecting a rotation of the receptacle by the weight of the fluid delivered thereto.

12. In a meter of the class described, a receptacle mounted for rotation in an inclined plane, partitions arranged within said receptacle and dividing the space therein into a plurality of compartments, the outer portions of said partitions being higher than their inner portions.

In testimony whereof I hereunto affix my signature this 18th day of February, 1919.

THEODORE S. AYERS.

Copies of this patent may be obtained for five cents each, by addressing the "Commissioner of Patents, Washington, D. C."